United States Patent
Whitten et al.

(10) Patent No.: US 11,760,432 B2
(45) Date of Patent: Sep. 19, 2023

(54) ELECTRONIC DEVICE MOUNT

(71) Applicant: ROKFORM IP LLC, Irvine, CA (US)

(72) Inventors: Jeff Whitten, Irvine, CA (US); Jose Estuardo Chavarria, Arcata, CA (US)

(73) Assignee: RokForm IP LLC, Irvine, CA (US)

( * ) Notice: Subject to any disclaimer, the term of this patent is extended or adjusted under 35 U.S.C. 154(b) by 290 days.

(21) Appl. No.: 17/183,180

(22) Filed: Feb. 23, 2021

(65) Prior Publication Data

US 2021/0261215 A1    Aug. 26, 2021

Related U.S. Application Data

(60) Provisional application No. 62/980,623, filed on Feb. 24, 2020.

(51) Int. Cl.
*B62J 11/00* (2020.01)
*B62J 11/20* (2020.01)

(52) U.S. Cl.
CPC ..................... *B62J 11/20* (2020.02)

(58) Field of Classification Search
CPC .......... Y10S 24/53; F16B 21/02; F16B 21/04; A45F 2005/026; A45F 2200/0508; A45F 2200/0516; A45F 5/00; A45F 5/02; A45F 2200/0525; B62J 11/00; B62J 50/225
See application file for complete search history.

(56) References Cited

U.S. PATENT DOCUMENTS

| | | | |
|---|---|---|---|
| 3,080,634 A * | 3/1963 | Stig | B60R 22/18 24/579.11 |
| 3,179,367 A | 4/1965 | Rapata | |
| 3,986,780 A | 10/1976 | Nivet | |
| 6,305,588 B1 * | 10/2001 | Michel | A45F 5/02 455/100 |
| 7,140,586 B2 * | 11/2006 | Seii | B60R 11/00 248/521 |
| D564,754 S | 3/2008 | Tages et al. | |
| 7,374,142 B2 | 5/2008 | Carnevali | |
| 7,523,906 B2 | 4/2009 | Bennett | |
| D606,738 S | 12/2009 | Hofer et al. | |

(Continued)

FOREIGN PATENT DOCUMENTS

| DE | 20 2004 017 041 U1 | 3/2005 |
|---|---|---|
| WO | WO 2013/106849 | 7/2013 |

OTHER PUBLICATIONS

International Search Report and Written Opinion re International Application No. PCT/US2013/021474 dated Apr. 2, 2013, in 12 pages.

(Continued)

*Primary Examiner* — Adam J Waggenspack
(74) *Attorney, Agent, or Firm* — Knobbe, Martens, Olson & Bear, LLC (57) ABSTRACT

An electronic device mount includes a first portion having an interlocking portion, a pressure plate, and a biasing member and a second portion having an attachment region. Where, in use, the biasing member applies force to the pressure plate inhibiting unintentional rotation of the second portion of the electronic device mount relative to the first portion. The electronic device mount can be incorporated within or attached to a protective case of an electronic device or any other object to be mounted that includes a suitable attachment region.

11 Claims, 8 Drawing Sheets

(56) References Cited

U.S. PATENT DOCUMENTS

| | | | |
|---|---|---|---|
| 7,652,888 B2 | 1/2010 | Bohlinger et al. | |
| 7,685,904 B2 | 3/2010 | Cutsforth | |
| D627,771 S | 11/2010 | Smith et al. | |
| 7,930,006 B2 | 4/2011 | Neu et al. | |
| D646,672 S | 10/2011 | Fathollahi | |
| D647,085 S | 10/2011 | Chung et al. | |
| D653,190 S | 1/2012 | Richter | |
| D654,043 S | 2/2012 | Pan et al. | |
| 8,167,127 B2 | 5/2012 | Martin et al. | |
| 8,172,247 B2 | 5/2012 | Weber et al. | |
| 8,267,418 B1 | 9/2012 | Chuang | |
| 8,317,067 B2 | 11/2012 | Lewis | |
| D671,932 S | 12/2012 | Azoulay | |
| 8,439,239 B2 | 5/2013 | Lee | |
| 8,469,245 B2 | 6/2013 | Gregory et al. | |
| D685,362 S | 7/2013 | Murchison et al. | |
| D685,363 S | 7/2013 | Murchison et al. | |
| D685,785 S | 7/2013 | Seoc et al. | |
| D687,004 S | 7/2013 | Behling | |
| 8,490,789 B2 | 7/2013 | Lach et al. | |
| 8,544,644 B2 | 10/2013 | Meehan | |
| D697,060 S | 1/2014 | Yang | |
| 8,708,151 B2 * | 4/2014 | Whitten | F16M 11/105 224/412 |
| D711,886 S | 8/2014 | Kerawala et al. | |
| 8,800,763 B2 | 8/2014 | Hale | |
| 8,830,663 B2 | 9/2014 | Child et al. | |
| D718,290 S | 11/2014 | Whitten et al. | |
| 8,936,222 B1 | 1/2015 | Bastian et al. | |
| D725,119 S | 3/2015 | Gaylord | |
| D726,170 S | 4/2015 | Ng | |
| D726,732 S | 4/2015 | Lay et al. | |
| D739,857 S | 9/2015 | Lay et al. | |
| 9,185,953 B2 | 11/2015 | Whitten et al. | |
| 9,243,739 B2 | 1/2016 | Peters | |
| 9,383,774 B2 | 7/2016 | Whitten et al. | |
| 9,402,016 B1 | 7/2016 | Hidalgo | |
| 9,498,034 B2 | 11/2016 | Whitten et al. | |
| 9,592,871 B2 | 3/2017 | Whitten et al. | |
| 9,616,821 B2 | 4/2017 | Elharar | |
| 9,700,114 B2 | 7/2017 | Whitten et al. | |
| 10,070,707 B2 | 9/2018 | Whitten et al. | |
| 10,093,377 B2 | 10/2018 | Whitten et al. | |
| 10,112,670 B2 | 10/2018 | Whitten et al. | |
| 10,122,400 B2 | 11/2018 | Tiller et al. | |
| 10,326,488 B2 | 6/2019 | Wojcik | |
| 10,420,407 B2 | 9/2019 | Whitten et al. | |
| 10,864,956 B2 | 12/2020 | Whitten et al. | |
| 11,044,974 B2 | 6/2021 | Whitten et al. | |
| 2002/0139822 A1 | 10/2002 | Infanti | |
| 2004/0204169 A1 | 10/2004 | Goradesky | |
| 2006/0147080 A1 | 7/2006 | Wilson et al. | |
| 2006/0229740 A1 | 10/2006 | Kreisel et al. | |
| 2007/0014120 A1 | 1/2007 | Kitamura | |
| 2007/0174187 A1 | 7/2007 | Altberg et al. | |
| 2007/0212931 A1 | 9/2007 | Livingston | |
| 2007/0221694 A1 | 9/2007 | Aguiliar | |
| 2008/0023508 A1 | 1/2008 | Harchol | |
| 2008/0251512 A1 | 10/2008 | Griffin et al. | |
| 2008/0314941 A1 | 12/2008 | Knych et al. | |
| 2010/0084527 A1 | 4/2010 | Lau et al. | |
| 2011/0043086 A1 | 2/2011 | Cui et al. | |
| 2011/0143583 A1 | 6/2011 | Zilmer et al. | |
| 2011/0227735 A1 | 9/2011 | Fawcett et al. | |
| 2012/0298820 A1 | 11/2012 | Manolidis | |
| 2013/0292270 A1 | 11/2013 | Lach et al. | |
| 2013/0292296 A1 | 11/2013 | Kang et al. | |
| 2014/0287800 A1 | 9/2014 | Ho | |
| 2014/0355200 A1 | 12/2014 | Thiers | |
| 2015/0189963 A1 | 7/2015 | Lai et al. | |
| 2015/0201723 A1 | 7/2015 | Rayner et al. | |
| 2016/0192752 A1 | 7/2016 | Lach et al. | |
| 2017/0183052 A1 | 6/2017 | Whitten et al. | |
| 2018/0099714 A1 | 4/2018 | Whitten et al. | |
| 2020/0077759 A1 | 3/2020 | Whitten et al. | |
| 2021/0188380 A1 | 6/2021 | Whitten et al. | |
| 2021/0315340 A1 | 10/2021 | Whitten et al. | |
| 2022/0117384 A1 | 4/2022 | Whitten | |

OTHER PUBLICATIONS

Bicio—GoRide—Bike Mount for iPhone 3G/3GS, http://www.bicio.com/GoRide_iphoneBikeMount.php, accessed via web archive, dated Nov. 29, 2011.

Bicio—GoRide Product page depicting an iPhone Bike Mount and Base Mount, http://www.bicio.com/category-bike.php, accessed via web archive, dated Dec. 8, 2011.

Bicio —GoRide iPhone Bike Mount, http://www.bicio.com/GoRide_iphoneBase.php, accessed via web archive, dated Apr. 16, 2011.

The Wallee—Features page depicting iPad hard case and wall plate, http://thewallee.com/site/about ("features" tab), accessed via web archive, dated Jan. 8, 2011.

The Wallee—Technical Specifications page depicting iPad hard case and wall plate, http://thewallee.com/site/about ("tech specs" tab), accessed via web archive, dated Jan. 8, 2011.

"The Wallee Wall Mount + Hard Case System for iPad", The Gadgeteer (Jul. 29, 2010), available at http://the-gadgeteer.com/2010/07/29/the-wallee-wall-mount-hard-case-system-for-ipad/.

Donovan, Thomas J., Letter to counsel for Applicant, Dec. 8, 2017. The Wallee iPad Case and Wall Mount, Jan. 2011 https://web.archive.org/web/20110108191535/http://thewallee.com/#, in 89 pages.

Affidavit of Christopher Buttler dated Nov. 18, 2017 and Exhibits Welcome to iBikeMount.com -The Bike Mount Solution for iPho . . . , https://web.archive.org/web/20090721175904/http://www.ibikemount.com:80/index.html, in 20 pages.

Donovan, Thomas J., Letter to counsel for Applicant, dated Mar. 15, 2018, and accompanying exhibits to letter.

* cited by examiner

ELECTRONIC DEVICE MOUNT

REFERENCE TO RELATED APPLICATIONS

This application claims the benefit of U.S. Provisional Application No. 62/980,632, filed Feb. 24, 2020, entitled ELECTRONIC DEVICE MOUNT.

This application hereby incorporates by reference the above-identified provisional application in its entirety.

BACKGROUND

Field

The disclosure relates to mounting arrangements in general and mounting arrangements for electronic devices in particular.

Description of the Related Art

Handheld and/or portable electronic devices (e.g., smartphones, tablet computers, handheld readers, portable speakers and similar devices) are becoming important and common tools. These tools are constantly in use, both at home and on the go.

However, with this frequency and variety of use comes the need or desirability for mounting the electronic device relative to another object. While certain mounting arrangements exist, there remains a need for improved arrangements that permit easier and/or more secure mounting, or at least provide the public with a useful choice.

SUMMARY

In some embodiments, an electronic device mount is disclosed. The electronic device mount comprises a mount assembly comprising a mount piece, an interlocking member and a second portion of the mount assembly.

An aspect of a disclosed embodiment involves an electronic device mount system having a case configured to be selectively connectable to the electronic device and retain the electronic device within an interior space of the case. The case includes a rear portion that is positioned along a rear surface of the electronic device and a side portion extending from the rear portion and being positioned adjacent at least a portion of a top, bottom, left and right sides of the electronic device. The rear portion of the case includes an attachment region defining an opening having a periphery. The periphery of the opening defines a plurality of case tabs. Each of the plurality of case tabs are separated by one of a plurality of access spaces. Each of the plurality of case tabs defines one of a plurality of cavities. A mount assembly comprises an interlocking member. The interlocking member includes at least one mount interlock portion comprising a plurality of engagement tabs. The mount assembly also includes a pressure plate and a biasing member. In use, the plurality of engagement tabs of the interlocking member are passed through a respective one of the access spaces of the attachment region and into a respective one of the plurality of cavities of the plurality of case tabs. The force of the biasing member applied to the pressure plate creates a retention force inhibiting unintentional rotation of the case relative to the mount assembly.

In some configurations, the biasing member is a wave spring.

In some configurations, the mount assembly is or is incorporated within a bike mount that, in use, is mounted to a component of a bicycle.

In some configurations, the bike mount comprises a cap portion that, in use, is secured to a steerer tube of the bicycle.

In some configurations, the bike mount further comprising an arm portion that extends between the cap portion and the interlocking member, wherein the arm portion is rotatably adjustable relative to the cap portion.

An aspect of a disclosed embodiment involves an electronic device mount system including a mount portion and a mountable portion. The mount portion includes an interlock portion having a plurality of interlock tabs. The mount portion also includes a pressure plate and a biasing member configured to apply a biasing force tending to move the pressure plate toward the interlock portion. The mountable portion includes an attachment region having an opening. A periphery of the opening defines a plurality of attachment tabs. Each of the plurality of attachment tabs are separated by one of a plurality of access spaces. The attachment region further comprises a plurality of cavities. Each of the plurality of cavities is associated with one of the plurality of attachment tabs. In use, each of the interlock tabs of the interlock portion are passed through a respective one of the plurality of access spaces of the attachment region and pressed against the pressure plate to move the pressure plate away from the interlock portion. The mount portion is rotated to align the plurality of interlock tabs with the plurality of cavities and moved axially to locate the plurality of interlock tabs within the plurality of cavities. The pressure plate secures the interlock tabs within the plurality of cavities utilizing the biasing force of the biasing member to create a retention force inhibiting unintentional rotation of the mountable portion relative to the mount portion.

In some configurations, the biasing member is a wave spring.

In some configurations, the mountable portion comprises an adhesive layer that permits the mountable portion to be secured to a surface via adhesion.

In some configurations, the mount portion is or is incorporated within a bike mount that, in use, is mounted to a component of a bicycle.

In some configurations, the bike mount comprises a cap portion that, in use, is secured to a steerer tube of the bicycle.

In some configurations, the bike mount further comprises an arm portion that extends between the cap portion and the mount portion, wherein the arm portion is rotatably adjustable relative to the cap portion.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

DETAILED DESCRIPTION

Embodiments of systems, components and methods of assembly and manufacture will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

FIGS. 1-7 illustrate an example embodiment of a mounting arrangement for a handheld and/or portable electronic device. The illustrated mounting arrangement is also suitable for use, or could be modified for use, with other handheld or similarly-sized objects. As used herein, handheld and/or portable electronic devices include, but are not limited to, smartphones, tablet computers, handheld readers, portable speakers and similar devices.

In at least some embodiments disclosed herein, the mounting arrangements can be implemented in the context of a protection system or case for a portable or handheld electronic device (hereinafter "handheld electronic device"). Some embodiments include a case that incorporates an attachment region for attaching a removable mount assembly configured to support the handheld electronic device within the case. The removable mount assembly can be configured to be affixed to a variety of surfaces. Some embodiments may also incorporate an optional anti-slip member comprising an anti-slip surface for slip prevention when the case and handheld electronic device are supported upon a surface. In some configurations, the case can include a magnet for attachment of the device to magnetic surfaces. The magnet can be housed within the anti-slip member or separately therefrom.

Although discussed in the context of a case for an electronic device, the mounting arrangement can also be used to removably couple other objects to a mount assembly. For example, in some configurations, a universal mounting puck can be provided with an attachment region and configured to adhesively or otherwise attach to an object to be mounted. Therefore, references to the case herein can equally refer to a universal mounting puck or any other object to be mounted that includes a suitable attachment region.

Figure 1A:
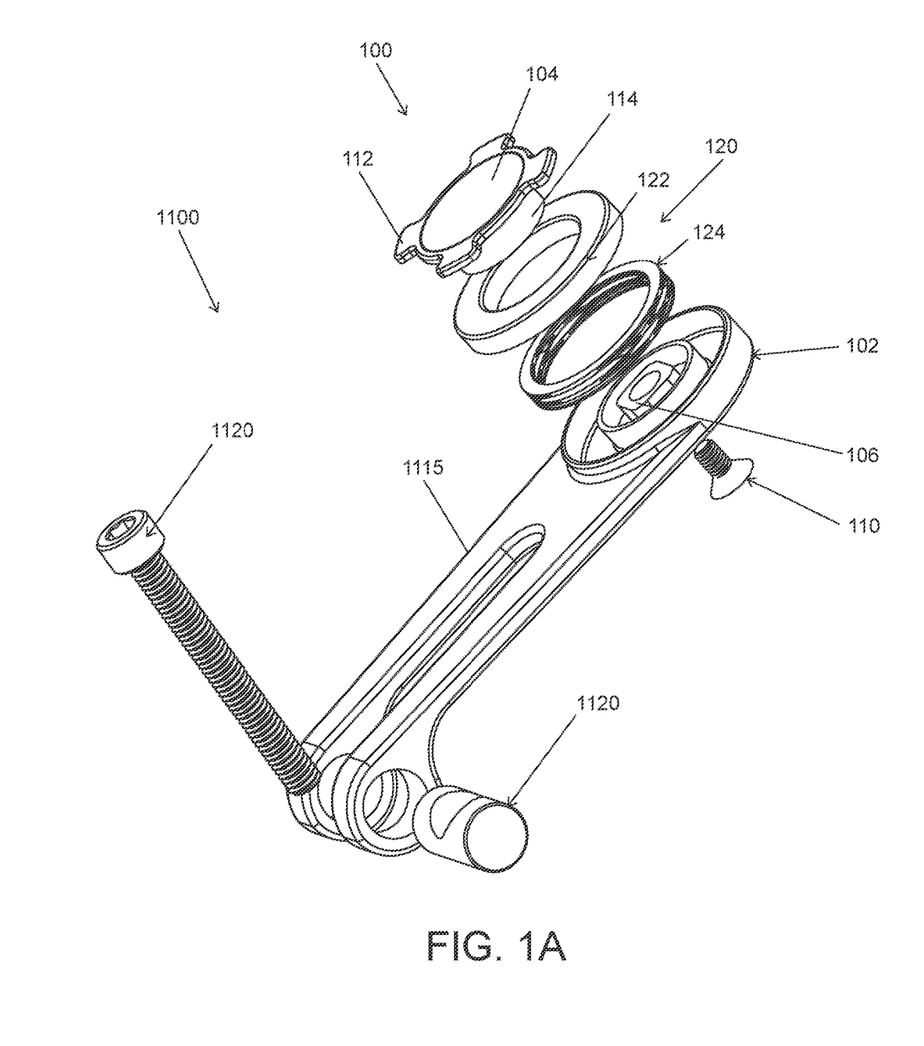
FIG. 1A is a perspective view of an exploded assembly of a first portion of a mounting arrangement for a handheld electronic device or a similar object incorporated into a bicycle mount.

With reference to FIG. 1A, an example mount assembly 100 is illustrated in the form of a bike mount 1100. However, the mount assembly 100 can be embodied in many forms. For example, the mount assembly 100 could be a generic mount configured for attachment to another object via a suitable connection, such as an adhesive or mechanical connection. The mount assembly 100 could be configured for attachment to a vehicle windshield or other glass (or smooth) surface by a suction cup or other suction element. The mount assembly 100 could be configured for connection to a handlebar of a handlebar-steered vehicle, such as a bicycle or a motorcycle. Examples of some mounting member types are disclosed in Applicant's U.S. Pat. No. 9,383,774, the entirety of which is incorporated by reference herein.

The illustrated bike mount 1100 may be mounted on or as a replacement of the top cap of a bicycle steering stem arrangement, preferably using bolt 1120. In particular, the bike mount 1100 preferably includes a cap (not shown) that replaces the top cap of a standard bicycle steering headset system and rests on the upper surface of the handlebar stem or stem spacer. As is known, the top cap is utilized to adjust a preload of the bearings in the bicycle steering headset system. The present bike mount 1100 can replace the standard top cap. In the illustrated arrangement, the bike mount 1100 includes an arm portion 1115 that extends from the cap. The arm portion 1115 is rotatably coupled to the cap by a pivot assembly comprising a pivot barrel 1120 to provide for adjustment of an angle of the arm portion 1115. Additional details of the bike mount 1100 are disclosed in the aforementioned '774 patent.

FIG. 1A illustrates the different components of mount assembly 100 in an exploded view with the components separated along an axis of the mount assembly 100. The illustrated arrangement includes a base 102, which is formed by a portion of the arm portion 1115. However, in other arrangements, the base 102 could be a separate member or could be integrated with another type of mount. As discussed above, the base 102 can be configured for adhesive or suction cup attachment to another object, for example. The mount assembly 100 also includes an interlocking member 104 that is coupled to the base 102. The interlocking member 104 can be rotationally fixed relative to the base 102. For example, the base 102 can include a non-circular boss 106 that engages a complementary recess (FIG. 1B) of the interlocking member 104. The interlocking member 104 can be secured to the base 102 in an axial direction by a mechanical fastener, such as a screw 110.

As shown in FIG. 1A, the interlocking member 104 has a plate-like portion having a plurality of engagement tabs 112 located (e.g., at 90-degree intervals) around the circumference of the plate-like portion of the interlocking member 104. The illustrated interlocking member 104 includes a cylindrical base portion 114 that supports the plate-like portion of the interlocking member 104 in a position spaced from the base 102.

The illustrated mount assembly 100 includes a retention arrangement 120 configured to retain the case on the interlocking member 104 and inhibit or prevent unintentional separation of the case from the mount assembly 100. In some configurations, the retention arrangement 120 is configured to permit convenient intentional removal of the case from the mount assembly 100. In some embodiments, the retention arrangement 120 is configured to allow single-handed removal of the case from the mount assembly 100. In other words, there is no lock actuator (e.g., a lever) that needs to be actuated with one hand of the user while the other hand of the user rotates the case relative to the mount assembly 100.

In the illustrated arrangement, the retention arrangement 120 comprises a retention body in the form of an annular pressure plate 122. The pressure plate 122 is biased toward the interlocking member 104 by a biasing member 124, which can be or comprise one or more springs. In the illustrated arrangement, the biasing member 124 is a wave spring, such as those sold under the tradename SMALLEY by the Smalley Steel Ring Company. However, other types of springs or other biasing members could also be used.

Figure 1B:
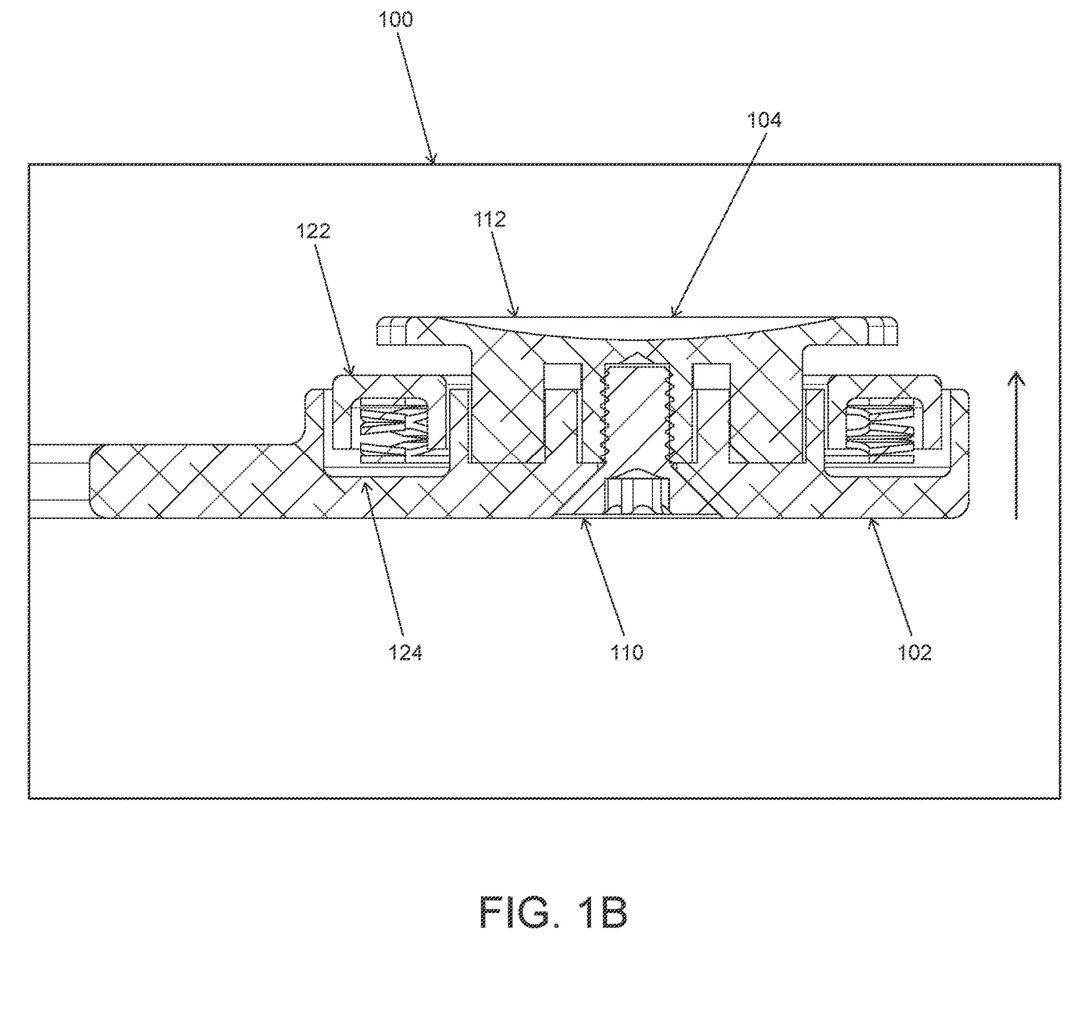
FIG. 1B is a partial cross sectional view of the first portion of the mounting arrangement for a handheld electronic device of FIG. 1A.

FIG. 1B illustrates the previously discussed different components of mount assembly 100 in a cross-sectional view along the x-axis of the mount assembly 100. The illustrated mount assembly 100 shows the interaction between the pressure plate 122 and biasing member 124. The pressure plate 122 can be biased away from the interlocking member 104 by the case when a user pushes the case onto the interlocking member 104 such that the interlocking member 104 passes through an opening in the case, as is described in further detail below. The case can then be rotated to engage the engagement tabs 112 of the interlocking member 104 with complementary structure of the case, which is described further below. The force applied to the case by the pressure plate 122 can inhibit or prevent undesired disengagement of the case from the interlocking member 104.

Figure 2:
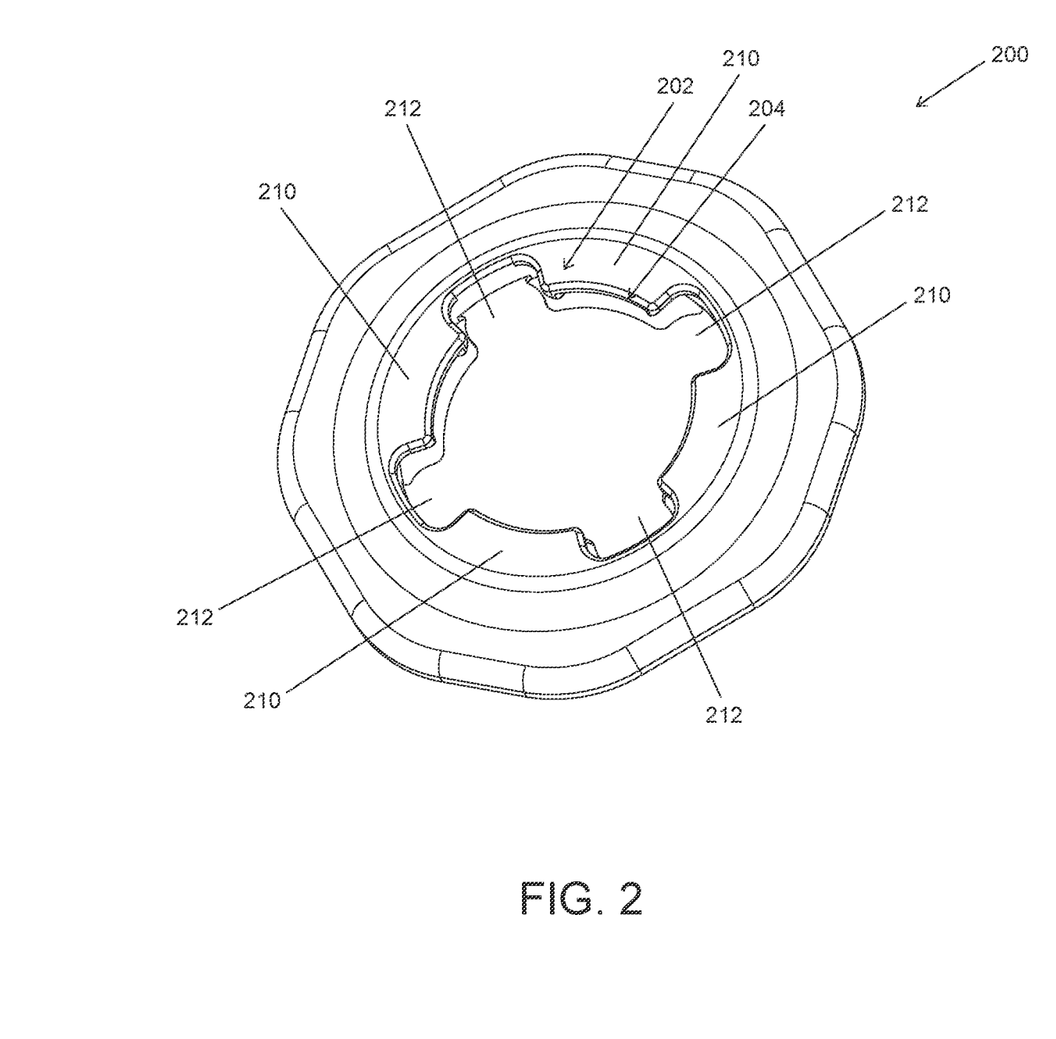
FIG. 2 is a perspective view of a second portion of the mounting arrangement containing an attachment region.
Figure 3:
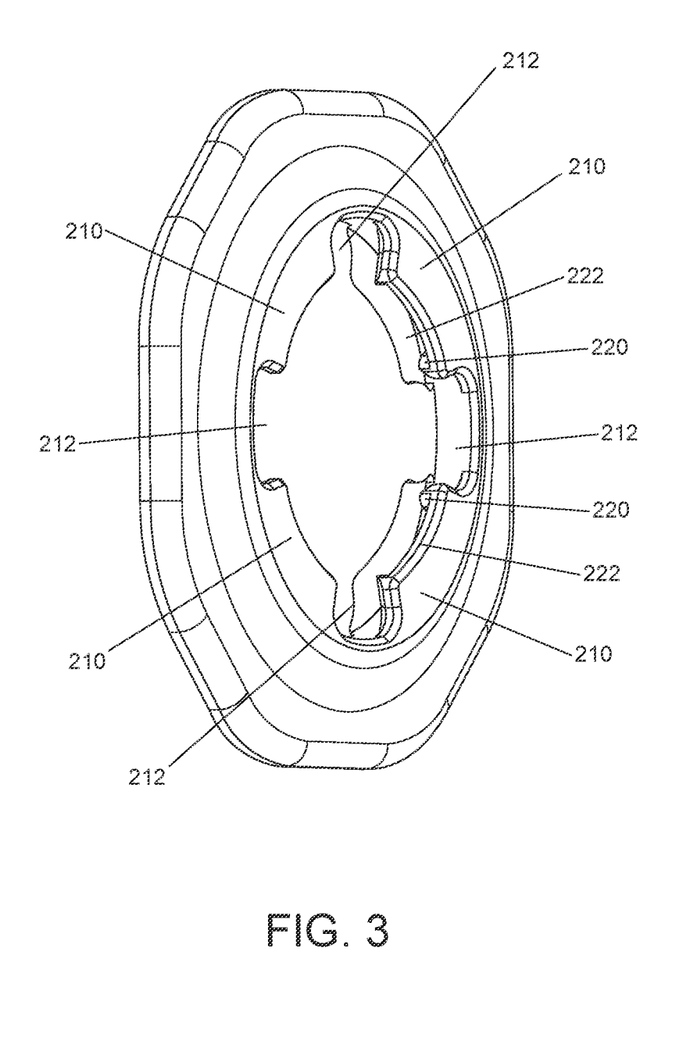
FIG. 3 is another perspective view of the second portion of the mounting arrangement of FIG. 2.
Figure 4:
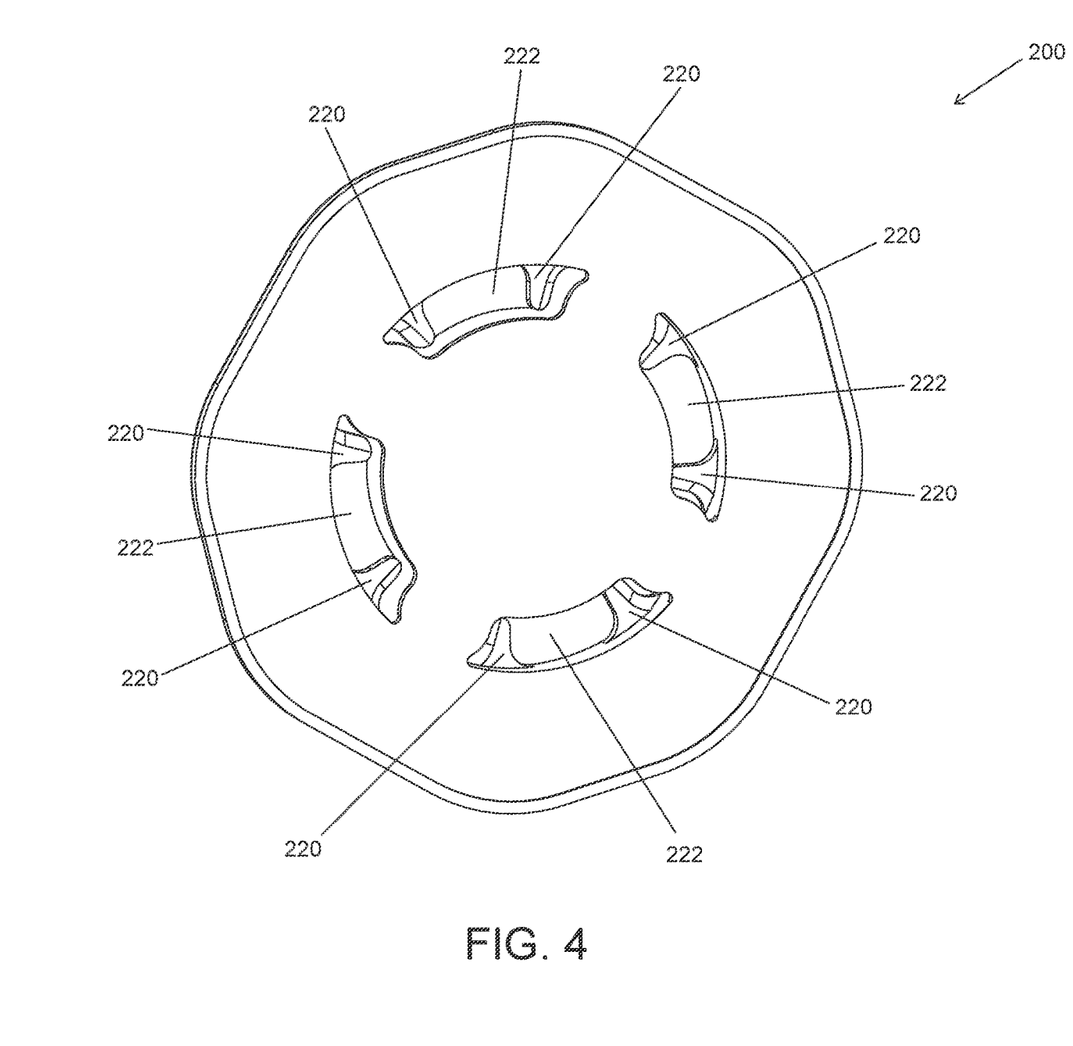
FIG. 4 is a perspective view of a rear side of the second portion of the mounting arrangement of FIG. 2.
Figure 6:
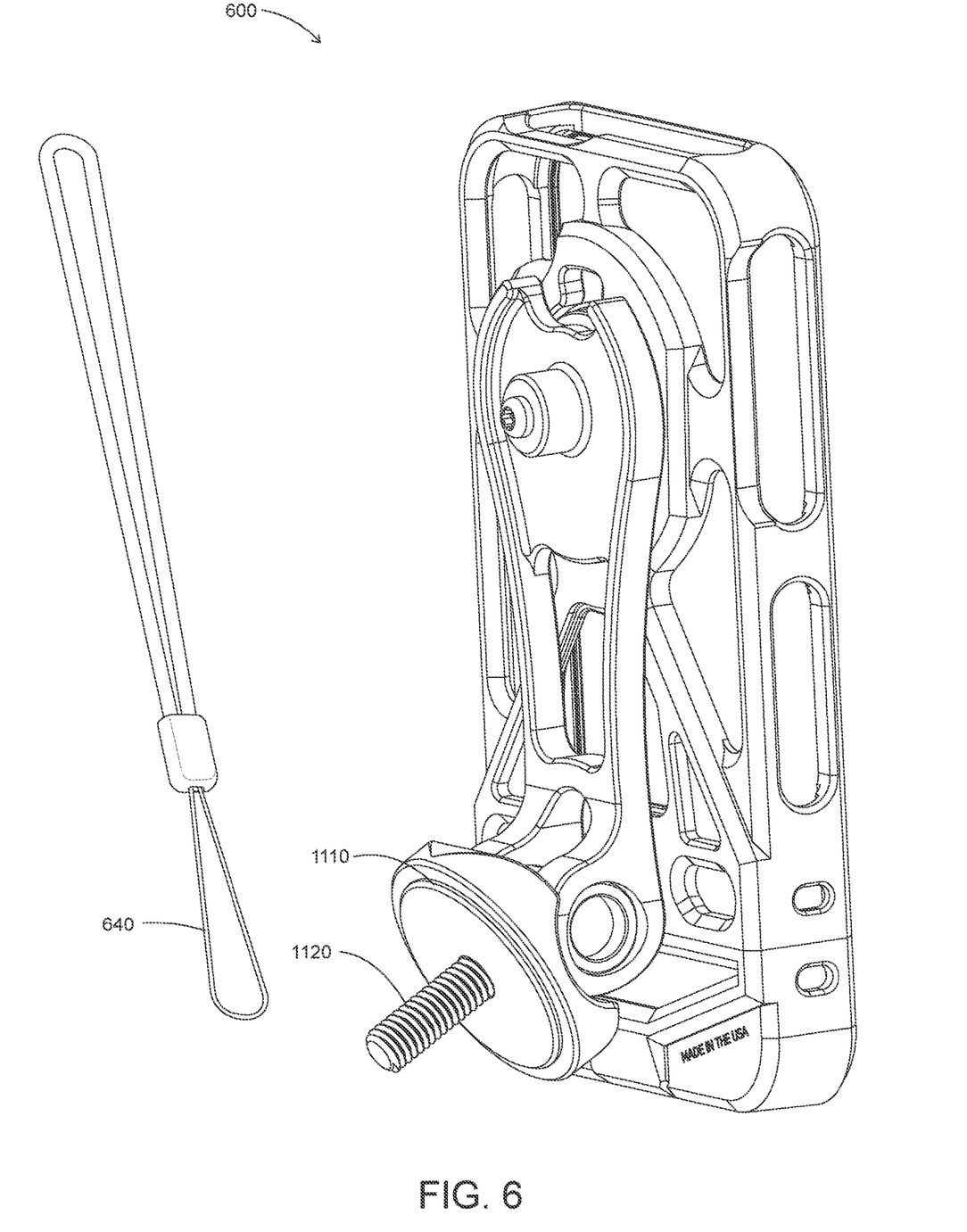
FIG. 6 is a perspective view of an exploded assembly of a protective case for a handheld electronic device incorporating the second portion of the mounting arrangement.
Figure 7:
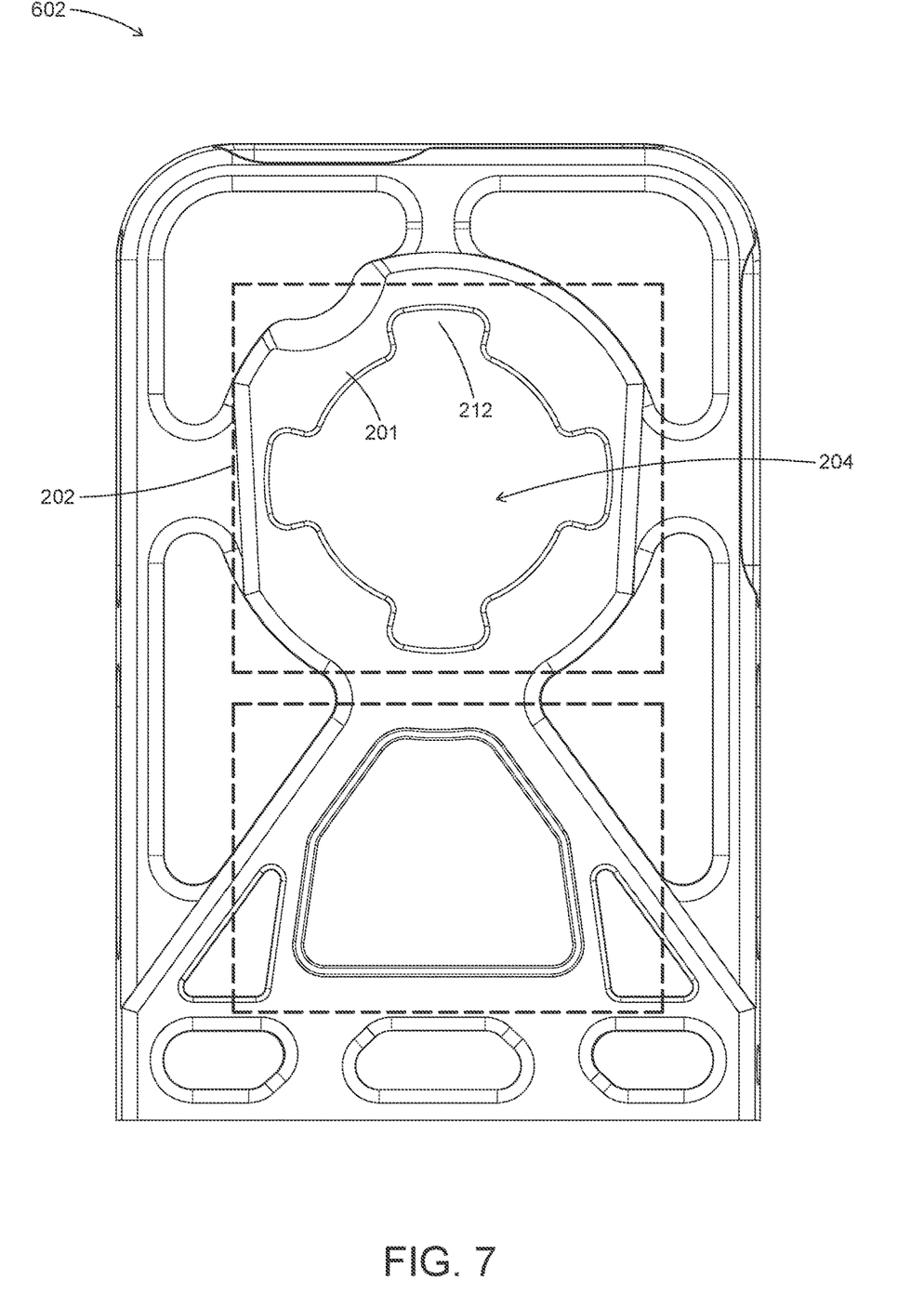
FIG. 7 is a view of the interior rear surface of a shell of the protective case of FIG. 6.

FIGS. 2-4 illustrate a second portion or mountable portion 200 of the mounting arrangement configured to be removably attached to the mount assembly 100. As described above, the second portion 200 may be a portion of a case for an electronic device, as shown in FIGS. 6 and 7, a universal mounting puck or another portion of an object to be mounted. The second portion 200 comprises an attachment region 202. The illustrated attachment region 202 defines an opening 204 configured to allow the interlocking member 104 to pass therethrough to selectively secure the second portion 200 to the mount assembly 100.

As illustrated, the attachment region 202 comprises at least one tab 210. In the illustrated arrangement, the attachment region 202 includes four tabs 210; however, other numbers of tabs 210 could also be provided, such as two, three, five, six or more tabs 210. The opening 204 preferably also includes at least one access space 212 located beside or circumferentially offset from the at least one tab 210. Preferably, the number of access spaces 212 corresponds to the number of tabs 210. In the illustrated arrangement, four access spaces 212 are provided; however, the number of access spaces 212 can vary in the same manner as the number of tabs 210. Each of the tabs 112 of the interlocking member 104 can be inserted through one of the access spaces 212 to allow for connection of the mount assembly 100 and the second portion 200.

With reference to FIGS. 3 and 4, an interior side of each tab 210 includes a wall 220 defining a cavity 222 configured to receive a tab 112 of the interlocking member 104. The wall 220 is located on both circumferential sides of the cavity 222 so that rotation of the interlocking member 104 is prevented when the tabs 112 are received within the cavities 222. In the illustrated arrangement, the wall 220 surrounds three sides of the cavity 222 to locate the second portion 200 relative to the interlocking member 104 in the axial direction of the mount assembly 100. The height of the wall 220 is sufficient to retain the tab 112 of the interlocking member 104 within the cavity 222 in response to normal or expected forces during use. The height of the wall 220 can be equal to or greater than a thickness of the tab 112.

In use, the second portion 200 can be manipulated to pass the interlocking member 104 through the opening 204. The second portion 200 can be pushed toward the base 102 of the mount assembly 100 against the biasing force of the biasing member 124. The second portion 200 is pushed until the pressure plate 122 is moved toward the base a sufficient distance that the tabs 112 of the interlocking member 104 clear the walls 220. The second portion 200 can then be turned to align the cavities 222 with the tabs 112 of the interlocking member 104. The second portion 200 can then be released in the axial direction such that the pressure plate 122 moves the second portion 200 in the axial direction, or the second portion 200 can be moved in the axial direction, to position the tabs 112 of the interlocking member 104 within the cavities 222 of the second portion 200. The force of the biasing member 124 acting on the pressure plate 122 creates a retention force that inhibits or prevents unintentional rotation of the second portion 200 relative to the interlocking member 104 (and, thus, separation of the second portion 200 from the mount assembly 100). To remove the second portion 200 from the mount assembly 100, the user pushes down on the second portion 200 (toward the base 102) with sufficient force to overcome the biasing force of the biasing member 124 so that the tabs 112 are disengaged from the cavities 222. The second portion 200 can then be rotated to align the tabs 112 with the access spaces 212, which permits the interlocking member 104 to pass through the opening 204 of the second portion 200. Advantageously, the assembly of the second portion 200 to the mount assembly 100 and the removal of the second portion 200 from the mount assembly 100 can be accomplished by the user using a single hand. As a result, the mounting arrangement is well-suited for use in active environments, such as cycling or motorcycling, for example. The single-handed attachment and removal process is more convenient in other environments, as well.

Figure 5:
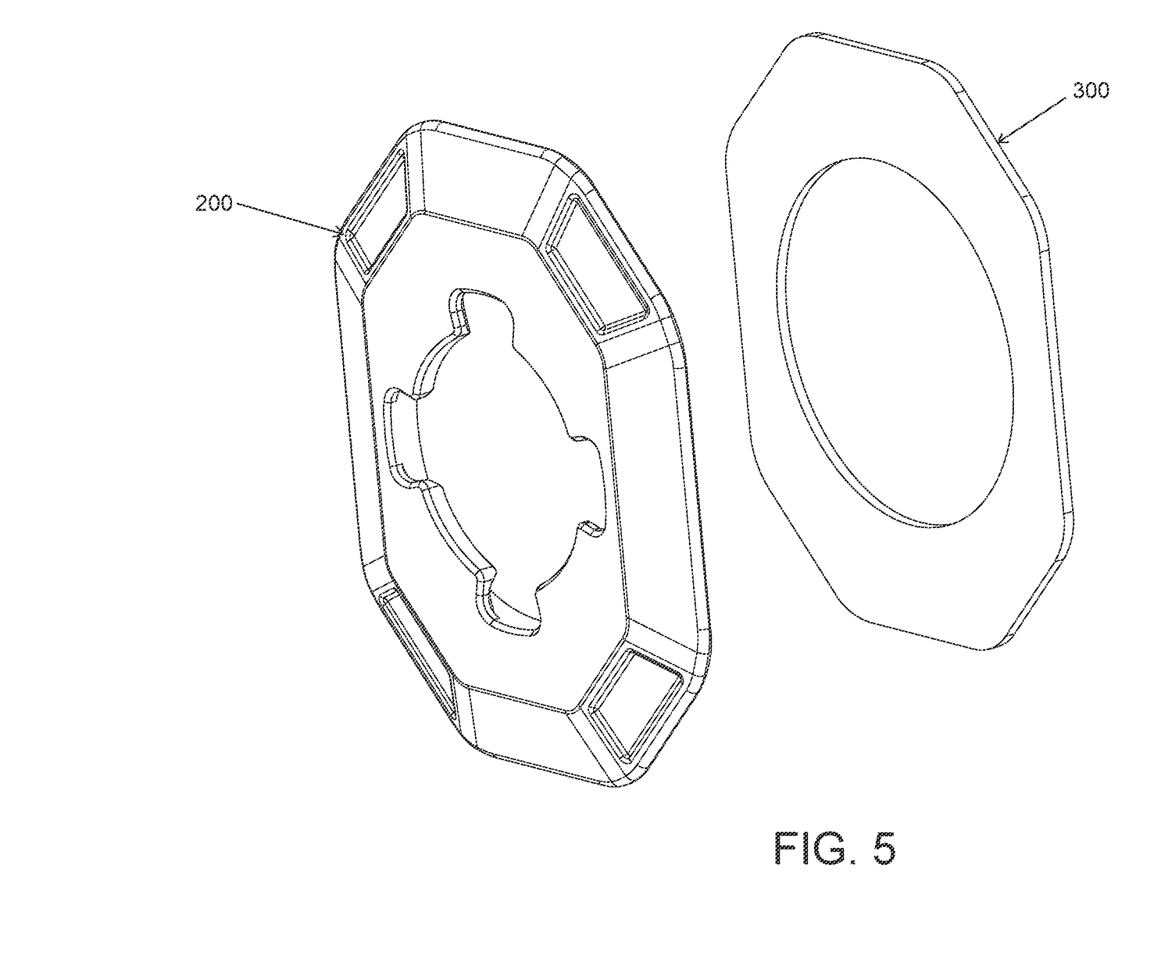
FIG. 5 is a perspective view of the second portion of the mounting arrangement of FIG. 2 in an exploded condition to show an adhesive layer.

In the arrangement of FIGS. 2-4, a rear wall portion is provided to define a closed internal end of the opening 204, such that the rear wall portion is positioned in between the interlocking member 104 and the associated electronic device (or other object). Such an arrangement may increase the overall thickness of the mounting arrangement 100, but may also provide increased protection to the associated electronic device. In some configurations, as shown in FIG. 5, the opening 204 passes completely through the second portion 200 such that a surface of the associated electronic device (or other object) is exposed through the opening 204. Such an arrangement advantageously minimizes the overall thickness of the mounting arrangement, while still providing the desired interlocking mount functionality. FIG. 5 also illustrates an adhesive layer separated from the main body of the second portion 200, which is in the form of a universal mounting puck or adapter. The adhesive layer can be a double-sided adhesive configured to connect the universal mounting adapter 200 to another object. The adhesive layer can be an acrylic foam tape, such as those sold under the tradename VHB by 3M.

As shown in FIG. 6, some embodiments include a case that incorporates an attachment region for attaching a removable mount assembly configured to support the handheld electronic device within the case. In some configurations, the attachment region can be the same as or similar to the second portion 200 of FIGS. 2-4 or FIG. 5. Some embodiments of the mounting arrangement comprise a protective case comprising a shell for securing and protecting a handheld electronic device, such as a smartphone in the illustrated arrangement. In some embodiments, the shell may be in multiple pieces for ease of assembly around a handheld electronic device. In other embodiments, the shell may include relatively soft or deformable regions (e.g., side walls) that facilitate assembly of the shell to the handheld electronic device. The shell can provide an attachment region for a removable mounting member that can attach to various surfaces, such as but not limited to a desk, vehicle dashboard, mirror, etc. The shell preferably is formed at least in part by a material that is generally rigid and lightweight, such as but not limited to an injection molded polycarbonate or other suitable plastic material(s). Preferably, the shell comprises sidewalls that surround an entirety or portions of the peripheral edges of the handheld electronic device. The sidewalls preferably are arranged to protect the device by absorbing incidental shock forces and/or inhibiting or preventing direct contact between the device and another object. The sidewalls also desirably contain various openings to allow access to the control buttons, inputs, and outputs of the handheld electronic device. The rear surface of the shell is preferably further designed with various openings to allow additional access to features of the handheld electronic device that may be located on the rear of the device (such as a camera lens or lenses) and/or to reduce the weight of the shell.

FIG. 6 depicts a protection system or case 600 having certain features, aspects and advantages of the preferred embodiments. In FIG. 6, the protection system 600 may include more, fewer or different components than those shown. The protection system 600 includes a body or shell that, in the illustrated arrangement, is comprised of an upper shell piece 602 and lower shell piece 604. Protection system 600 is shown in two pieces to facilitate installation of the protection system 600 on a handheld electronic device. Lower shell piece 604 is designed, in one embodiment, to fit together with upper shell piece 602 preferably using an interlocking or tab/slot attachment. However, in other arrangements, the upper shell piece 602 and lower shell piece 604 could be secured together with other arrangements (e.g., mechanical fasteners, such as screws) or could be portions of a unitary or single-piece shell in which installation of the electronic device is accomplished through another method, such as by deformation of the side walls or other portions of the shell to pass over the electronic device. Thus, references to the upper shell piece 602 or lower shell piece 604 herein are also intended to refer to the entire shell of an integrated or unitary shell arrangement.

Upper shell piece 602 preferably includes an attachment region 606 for attaching interlocking member 104. In the illustrated arrangement, the attachment region 60 is identical to the second portion 200 of FIGS. 2-4 or FIG. 5. In particular, the attachment region 606 contains an engagement structure that allows the upper shell piece 602 and, thus, the protection system 600 to be releasably attached to the interlocking member 104 of the mount assembly 100. The upper shell piece 602 also preferably includes a non-slip region 610 which includes a non-slip arrangement that enhances frictional engagement of protection system 600 with a surface on which the protection system 600 may be placed. In the illustrated arrangement, the non-slip region 610 incorporates an opening or cavity in the protection system 600 (e.g., the upper shell piece 602) into which non-slip member may be located, such as via insertion or over-molding. If desired, the protection system 600 can incorporate a magnet, such as in a cavity of the non-slip member, to allow the protection system 600 to be secured to another magnet or a suitable metal object. Suitable examples of a non-slip member and a magnet are disclosed in Applicant's U.S. Pat. No. 9,383,774.

FIG. 6 further depicts a lanyard 640, which may attach to the protection system 600 to facilitate easy carrying and transport of a handheld electronic device. For example, the lanyard 640 can be looped through openings 642 and 644 on the upper shell piece 602 and lower shell piece 604, respectively, which can also serve as a redundant mechanism for inhibiting or preventing separation of the upper shell piece 602 and the lower shell piece 604. Additional accessories may be used with protection system 600. For example, one accessory that may be used with protection system 600 is a bike mount 1100, one embodiment of which is also shown in FIGS. 1A and 1B. Another accessory that may be used with protection system 600 includes a tripod (not shown), which can support the protection system 600 and associated electronic device in a suitable position (e.g., portrait or landscape) preferably at an elevated position relative to a surface on which the tripod rest to take photographs or video. The accessory can be coupled to the protection system 600 via an interlocking arrangement the same as or similar to the interlocking member 104 or via other suitable arrangements, such as the same as or similar to the lanyard 640 arrangement. In addition to the lanyard 640, bike mount and tripod, other types of accessories can also be provided, such as adjustable or non-adjustable stands, mounting or securing clip arrangements, etc.

As illustrated in FIG. 6 and FIG. 7, the illustrated attachment region 202 defines an opening 204 that passes partially or entirely through the rear surface of upper shell piece 602. As described above, attachment region 202 is configured to allow attachment of interlocking member 104 through an interlocking attachment that selectively secures the shell 602 to the interlocking member 104 and inhibits or prevents unintentional removal in at least one direction. As pictured, attachment region 202 comprises at least one tab 210, each of which preferably defines a wall 220 defining a cavity 222 configured to receive the tab 210, as described above. In the illustrated arrangement, the attachment region 202 includes four tabs 210; however, other numbers of tabs 210 could also be provided, such as two, three, five, six or more tabs 210.

The opening 204 preferably also includes at least one access space 212 located beside or circumferentially offset from the at least one tab 210. Preferably, the number of access spaces 212 corresponds to the number of tabs 210. In the illustrated arrangement, four access spaces 212 are provided; however, the number of access spaces 212 can vary in the same manner as the number of tabs 210. Each of the tabs 210 of the interlocking member 104 can be inserted through one of the access spaces 212 and then turned to enter the cavity 222 (FIG. 4) to form an attachment with upper shell piece 602. In the illustrated arrangement, a circumferential dimension of the access space 212 is smaller than a circumferential dimension of the tab 210 and can be approximately one-half of the circumferential dimension of the tab 210.

The attachment region 202 of the protective system 600 operates with the interlocking member 104 of the mount assembly 100 in the same manner as the interlocking member 104 operates with the second portion 200 of the mounting arrangement described above. In use, the attachment region 202 can be manipulated to pass the interlocking member 104 through the opening 204 of the attachment region 202. The protective system 600 can be pushed toward the base 102 of the mount assembly 100 against the biasing force of the biasing member 124. The protective system 600 is pushed until the pressure plate 122 is moved toward the base a sufficient distance that the tabs 112 of the interlocking member 104 clear the wall(s) 220 of the attachment region 202. The protective system 600 can then be turned to align the cavities 222 with the tabs 112 of the interlocking member 104. The protective system 600 can then be released in the axial direction such that the pressure plate 122 moves the protective system 600 in the axial direction, or the protective system 600 can be moved in the axial direction, to position the tabs 112 of the interlocking member 104 within the cavities 222 of the attachment region 202. The force of the biasing member 124 acting on the pressure plate 122 creates a retention force that inhibits or prevents unintentional rotation of the protective system 600 relative to the interlocking member 104 (and, thus, separation of the protective system 600 from the mount assembly 100).

To remove the protective system 600 from the mount assembly 100, the user pushes down on the protective system 600 (toward the base 102) with sufficient force to overcome the biasing force of the biasing member 124 so that the tabs 112 are disengaged from the cavities 222. The protective system 600 can then be rotated to align the tabs 112 with the access spaces 212 of the attachment region 202, which permits the interlocking member 104 to pass through the opening of the attachment region 202 of the protective system 600. Advantageously, the assembly of the protective system 600 to the mount assembly 100 and the removal of the protective system 600 from the mount assembly 100 can be accomplished by the user using a single hand.

CONCLUSION

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. An electronic device mount system, comprising:
a case configured to be selectively connectable to an electronic device and retain the electronic device within an interior space of the case, the case comprising a rear portion that is positioned along a rear surface of the electronic device and a side portion extending from the rear portion and being positioned adjacent at least a portion of a top, bottom, left and right sides of the electronic device;

wherein the rear portion of the case comprises an attachment region defining an opening having a periphery, wherein the periphery of the opening defines a plurality of case tabs, wherein each of the plurality of case tabs are separated by one of a plurality of access spaces, wherein each of the plurality of case tabs defines one of a plurality of cavities;

a mount assembly comprising an interlocking member, the interlocking member comprising:
   at least one mount interlock portion comprising a plurality of engagement tabs;
   a pressure plate and;
   a biasing member;

wherein, in use, the plurality of engagement tabs of the interlocking member are passed through a respective one of the access spaces of the attachment region and into a respective one of the plurality of cavities of the plurality of case tabs, and wherein the force of the biasing member applied to the pressure plate creates a retention force inhibiting unintentional rotation of the case relative to the mount assembly.

2. The electronic device mount system of claim 1, wherein the biasing member is a wave spring.

3. The electronic device mount system of claim 1, wherein the mount assembly is or is incorporated within a bike mount that, in use, is mounted to a component of a bicycle.

4. The electronic device mount system of claim 3, wherein the bike mount comprises a cap portion that, in use, is secured to a steerer tube of the bicycle.

5. The electronic device mount system of claim 4, wherein the bike mount further comprising an arm portion that extends between the cap portion and the interlocking member, wherein the arm portion is rotatably adjustable relative to the cap portion.

6. An electronic device mount system, comprising:
   a mount portion comprising an interlock portion having a plurality of interlock tabs, a pressure plate, and a biasing member configured to apply a biasing force tending to move the pressure plate toward the interlock portion; and
   a mountable portion comprising an attachment region having an opening, a periphery of the opening defining a plurality of attachment tabs, each of the plurality of attachment tabs separated by one of a plurality of access spaces, the attachment region further comprising a plurality of cavities, each of the plurality of cavities associated with one of the plurality of attachment tabs;

wherein, in use, each of the interlock tabs of the interlock portion are passed through a respective one of the plurality of access spaces of the attachment region and pressed against the pressure plate to move the pressure plate away from the interlock portion, the mount portion is rotated to align the plurality of interlock tabs with the plurality of cavities and moved axially to locate the plurality of interlock tabs within the plurality of cavities, and wherein the pressure plate secures the interlock tabs within the plurality of cavities utilizing the biasing force of the biasing member to create a retention force inhibiting unintentional rotation of the mountable portion relative to the mount portion.

7. The electronic device mount system of claim 6, wherein the biasing member is a wave spring.

8. The electronic device mount system of claim 6, wherein the mountable portion comprises an adhesive layer that permits the mountable portion to be secured to a surface via adhesion.

9. The electronic device mount system of claim 6, wherein the mount portion is or is incorporated within a bike mount that, in use, is mounted to a component of a bicycle.

10. The electronic device mount system of claim 9, wherein the bike mount comprises a cap portion that, in use, is secured to a steerer tube of the bicycle.

11. The electronic device mount system of claim 10, wherein the bike mount further comprises an arm portion that extends between the cap portion and the mount portion, wherein the arm portion is rotatably adjustable relative to the cap portion.

* * * * *

UNITED STATES PATENT AND TRADEMARK OFFICE
CERTIFICATE OF CORRECTION

| | | |
|---|---|---|
| PATENT NO. | : 11,760,432 B2 | |
| APPLICATION NO. | : 17/183180 | |
| DATED | : September 19, 2023 | |
| INVENTOR(S) | : Jeff Whitten et al. | |

It is certified that error appears in the above-identified patent and that said Letters Patent is hereby corrected as shown below:

On the Title Page

Column 2 (U.S. Patent Documents), Line 4, delete "Seii" and insert -- Seil --.

Column 2 (Attorney Agent, or Firm), Line 2, delete "LLC" and insert -- LLP --.

Page 2, Column 1 (U.S. Patent Documents), Line 40, delete "EIharar" and insert -- Elharar --.

In the Specification

Column 1, Line 6, delete "62/980,632," and insert -- 62/980,623, --.

Signed and Sealed this
Fifth Day of December, 2023

Katherine Kelly Vidal
*Director of the United States Patent and Trademark Office*